US008987953B2

United States Patent
Goesch et al.

(10) Patent No.: US 8,987,953 B2
(45) Date of Patent: Mar. 24, 2015

(54) PERMANENT MAGNET ELECTRIC MACHINE INCLUDING PERMANENT MAGNETS HAVING A SLEEVE FORMED FROM A THERMAL INTERFACE MATERIAL

(75) Inventors: Thomas Goesch, Noblesville, IN (US); Colin Hamer, Noblesville, IN (US); Koon Hoong Wan, Indianapolis, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 305 days.

(21) Appl. No.: 13/609,574

(22) Filed: Sep. 11, 2012

(65) Prior Publication Data

US 2014/0070635 A1   Mar. 13, 2014

(51) Int. Cl.
*H02K 1/32* (2006.01)
*H02K 1/27* (2006.01)
*H02K 9/22* (2006.01)
*H02K 15/03* (2006.01)

(52) U.S. Cl.
CPC ............... *H02K 9/22* (2013.01); *H02K 1/2766* (2013.01); *H02K 15/03* (2013.01); *Y10T 29/49012* (2015.01)
USPC ........................... 310/64; 310/156.03; 29/596

(58) Field of Classification Search
USPC ............... 310/156.01–156.84, 52, 54, 58, 64; 29/596
See application file for complete search history.

(56) References Cited

U.S. PATENT DOCUMENTS

| | | | |
|---|---|---|---|
| 7,608,966 B2 * | 10/2009 | Mizutani et al. | 310/156.53 |
| 8,237,320 B2 | 8/2012 | Saban et al. | |
| 8,415,849 B2 * | 4/2013 | Mizuno et al. | 310/156.53 |
| 8,702,898 B2 * | 4/2014 | Zapf | 156/330 |
| 2002/0125779 A1 * | 9/2002 | Qin et al. | 310/156.12 |
| 2007/0205686 A1 * | 9/2007 | Ishida | 310/156.21 |
| 2009/0278417 A1 * | 11/2009 | Mizuno et al. | 310/156.53 |
| 2011/0133590 A1 | 6/2011 | Lokhandwalla et al. | |
| 2012/0274165 A1 * | 11/2012 | Fukaya et al. | 310/156.01 |
| 2013/0205842 A1 | 8/2013 | Kim | |

FOREIGN PATENT DOCUMENTS

JP  200842967 A  2/2008
KR  10-2012-0067855 A  6/2012

OTHER PUBLICATIONS

International Search Report and Written Opinion for PCT Application No. PCT/US2013/058387, dated Dec. 20, 2013, pp. 1-12.

* cited by examiner

*Primary Examiner* — Hanh Nguyen
(74) *Attorney, Agent, or Firm* — Cantor Colburn LLP

(57) ABSTRACT

An electric machine includes a housing, a stator fixedly mounted relative to the housing, and a rotor assembly rotatably mounted relative to the stator. The rotor assembly includes a plurality of rotor laminations forming a rotor body, one or more permanent magnets provided in the rotor body, and a sleeve extending around the one or more permanent magnets. The sleeve provides a thermal interface between the one or more permanent magnets and the rotor body.

18 Claims, 4 Drawing Sheets

PERMANENT MAGNET ELECTRIC MACHINE INCLUDING PERMANENT MAGNETS HAVING A SLEEVE FORMED FROM A THERMAL INTERFACE MATERIAL

BACKGROUND OF THE INVENTION

Exemplary embodiments pertain to the art of electric machines and, more particularly, to a permanent magnet electric machine including permanent magnets having a sleeve formed from a thermal interface material.

Electric machines produce work from electrical energy passing through a stator to induce an electro-motive force in a rotor. The electro-motive force creates a rotational force at the rotor. The rotation of the rotor is used to power various external devices. Of course, electric machines can also be employed to produce electricity from a work input. In either case, electric machines are currently producing greater outputs at higher speeds and are being designed in smaller packages. In the case of permanent magnet electric machines, magnets are being designed to possess a higher flux density in a smaller form-factor. Such magnets generally are formed from, or include various rare earth metals.

BRIEF DESCRIPTION OF THE INVENTION

Disclosed is an electric machine including a housing, a stator fixedly mounted relative to the housing, and a rotor assembly rotatably mounted relative to the stator. The rotor assembly includes a plurality of rotor laminations forming a rotor body, one or more permanent magnets provided in the rotor body, and a sleeve extending around the one or more permanent magnets. The sleeve provides a thermal interface between the one or more permanent magnets and the rotor body.

Also disclosed is a rotor assembly including a plurality of rotor laminations forming a rotor body, one or more permanent magnets provided in the rotor body, and a sleeve extending around the one or more permanent magnets. The sleeve provides a thermal interface between the one or more permanent magnets and the rotor body.

Further disclosed is a method of forming a rotor assembly. The method includes stacking a plurality of rotor laminations, aligning a plurality of slots formed in each of the plurality of rotor laminations, joining the plurality of rotor laminations to form a rotor body, inserting a permanent magnet into a sleeve, and guiding the permanent magnet into one of the plurality of slots, the sleeve providing a thermal interface between the permanent magnet and the rotor body.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
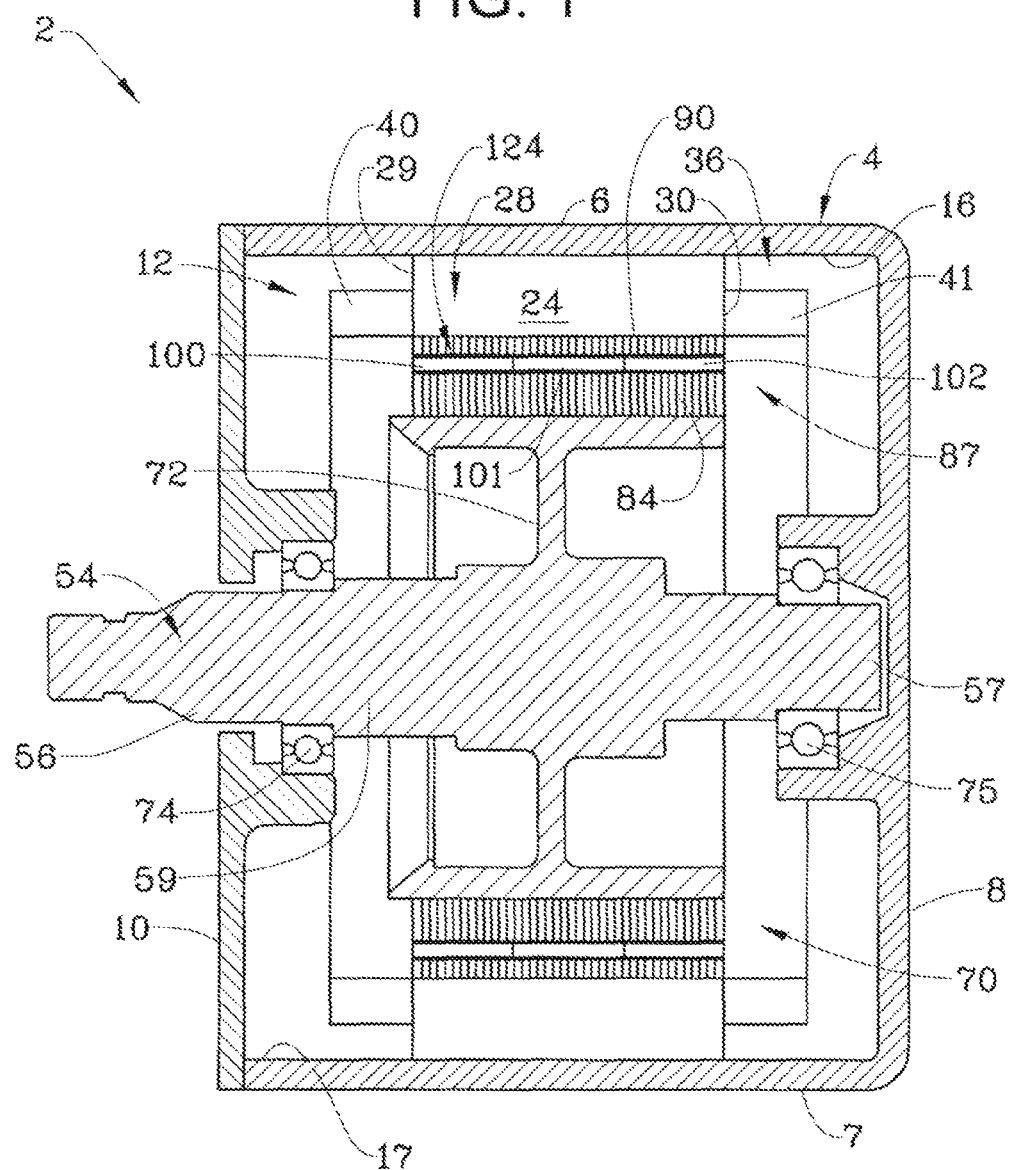
FIG. 1 depicts a cross-sectional side view of an electric machine including a rotor assembly having permanent magnets provided with a sleeve in accordance with an exemplary embodiment.

A permanent magnet electric machine in accordance with an exemplary embodiment is indicated generally at 2 in FIG. 1. Electric machine 2 includes a housing 4 having first and second side walls 6 and 7 that are joined by a first end wall 8 and a second end wall or cover 10 to collectively define an interior portion 12. First side wall 6 includes a first inner surface 16 and second side wall 7 includes a second inner surface 17. At this point it should be understood that housing 4 could also be constructed to include a single side wall having a continuous inner surface. Electric machine 2 is further shown to include a stator 24 arranged at first and second inner surfaces 16 and 17 of first and second side walls 6 and 7. Stator 24 includes a body or stator core 28, having a first end portion 29 that extends to a second end portion 30, which supports a plurality of windings 36. Windings 36 include a first end turn portion 40 and a second end turn portion 41.

Figure 2:
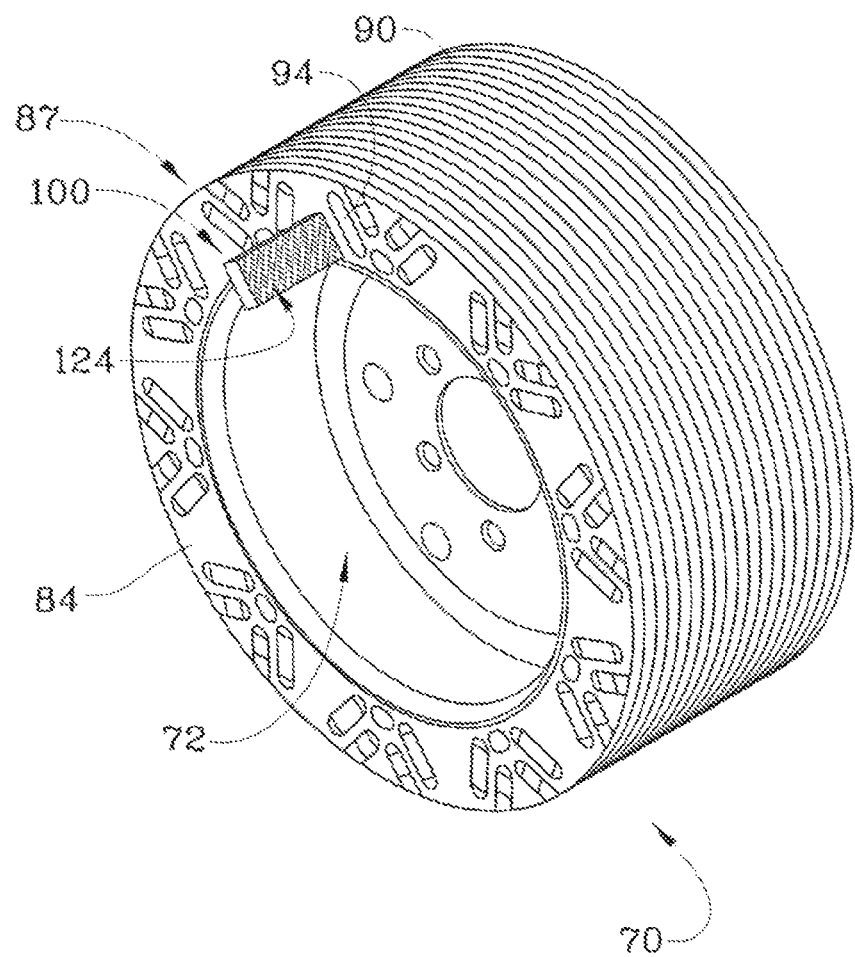
FIG. 2 depicts a perspective view of the rotor assembly of FIG. 1.

Electric machine 2 is also shown to include a shaft 54 rotatably supported within housing 4. Shaft 54 includes a first end 56 that extends to a second end 57 through an intermediate portion 59. Shaft 54 supports a rotor assembly 70. Rotor assembly 70 includes a hub 72 including a first bearing 74 that supports first end 56 relative to second end wall 10, and a second bearing 75 that supports second end 57 relative to first end wall 8. Rotor assembly 70 includes a plurality of rotor laminations, one of which is indicated at 84, that collectively define a rotor body 87 having an outer surface 90. Each rotor lamination 84 includes a plurality of slots, one of which is indicated at 94 in FIG. 2. Rotor laminations 84 are stacked and slots 94 are aligned prior to undergoing a bonding process that forms rotor body 87. A plurality of permanent magnets (PM) 100, 101, and 102 are provided in rotor body 87 in slots 94.

Figure 3:
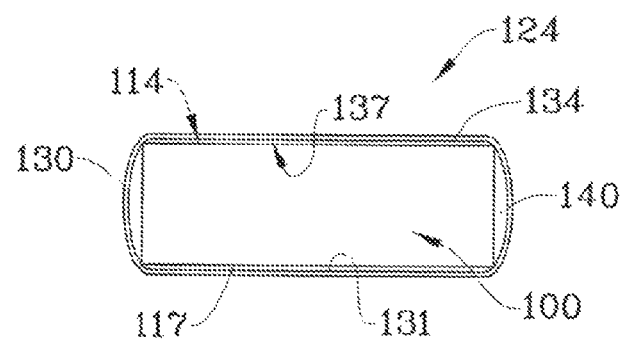
FIG. 3 depicts an end view of one of the permanent magnets of FIG. 2 having a sleeve prior to shrinking.

Reference will now be made to FIG. 3 in describing PM 100 with an understanding that PM 101 and PM 102 include similar structure. PM 100 includes a body 114 having an outer surface portion 117. In the exemplary embodiment shown, PM 100 is covered by a sleeve 124. Sleeve 124 includes an outer surface 130 and an inner surface 131. Outer surface 130 and inner surface 131 define a selectively changeable thickness 134 for sleeve 124. Inner surface 131 also defines a selectively changeable internal dimension 137 of sleeve 124. Sleeve 124 is formed from a flexible material and also includes a thermal interface material (TIM) and disposed about PM 100. In accordance with an aspect of the exemplary embodiment, sleeve 124 may include silicone rubber, epoxy, polyolefin, poly tetra fluoro ethylene (PTFE), fluorinated ethylene propylene (FEP), polyvinylidene fluoride (PVDF) and/or polyvinyl chloride (PVC). TIM material is included in the sleeve material. Examples of TIM material include metals such as aluminum powder, and non-metals such as Alumina ($Al_2O_3$), graphite, boron nitride, and/or beryllium oxide. As shown, sleeve 124 may be initially loosely disposed about PM 100 such that voids 140 may exist between outer surface portion 117 and inner surface 131.

Figure 4:
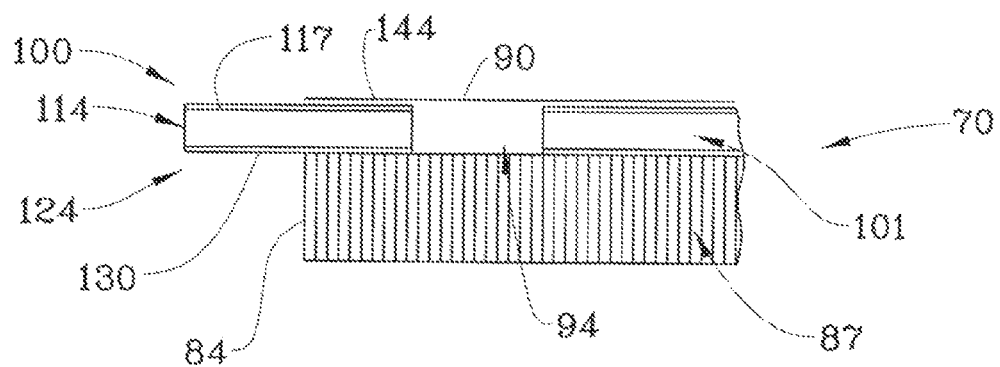
FIG. 4 depicts a partial cross-sectional view of the rotor assembly of FIG. 2 illustrating permanent magnets provided with a sleeve prior to shrinking.
Figure 5:
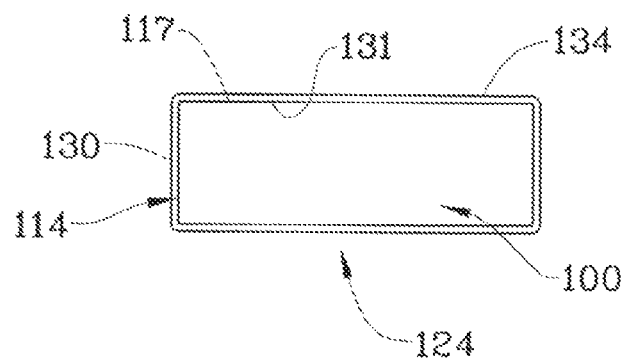
FIG. 5 depicts the permanent magnet of FIG. 3 after shrinking the sleeve.
Figure 6:
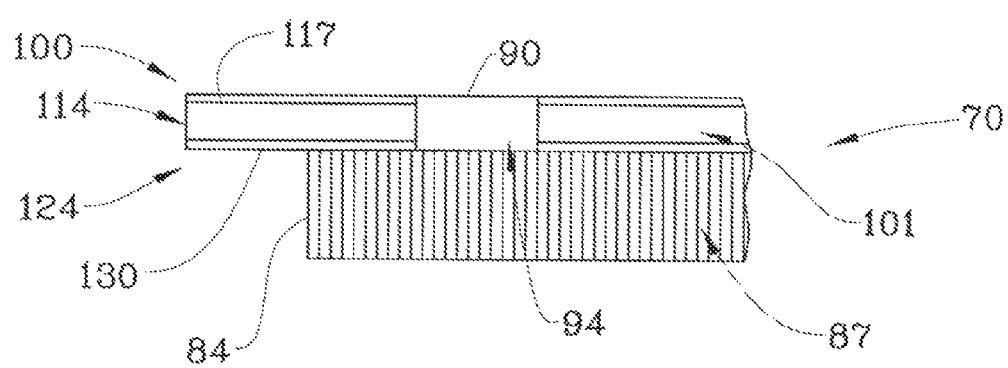
FIG. 6 depicts a partial cross-sectional view of the rotor assembly of FIG. 4 after shrinking the sleeve about the permanent magnets.

As shown in FIG. 4, PM 100 is inserted into slot 94 of rotor body 87. Upon initial insertion, a gap 144 may exist between outer surface 130 of sleeve 124 and an inner surface (not separately labeled) of slot 94. Of course, it should be understood that in certain cases gap 144 may not exist. For example, sleeve 124 may be formed from an elastic material and expanded about and placed over PM 100. For example, sleeve 124 may be formed from a silicon based elastic material. Sleeve 124 may then return to an initial state that more closely conforms to an outer surface (not separately labeled) of PM 100. Gap 144 is presented to illustrate that PM's 100, 101 and 102 are readily insertable into slot 94. After insertion, rotor body 87 is exposed to an activating input that causes internal dimension 137 to shrink causing sleeve 124 to contract about PM 100. Alternatively, PM 100 may be exposed to an activating input to cause sleeve 124 to shrink prior to insertion into rotor body 87. The activating input also cause thickness 134 to expand joining PM 100 to rotor body 87. The activating input may take the form of applied heat originating from an external source such as a heat gun, oven or the like, or may result from operation of electric machine 2. The activating input may also include applying a magnetizing force that closes and maintains gap 144 closed. In addition to facilitating a bond between PM 100 and rotor body 87, sleeve 124 also establishes a thermal interface between PM 100 and rotor body 87. The thermal interface provides a pathway allowing heat to flow from PM 100 and away from rotor body 87. Heat removal from the permanent magnets enhances magnet field retention increasing an overall magnet service life.

At this point it should be understood that the exemplary embodiments provide permanent magnets in a PM electric machine with a sleeve that not only establishes a desired retention between the permanent magnets and a rotor, but also establishes a thermal interface that facilitates heat removal. In addition, while described as being activated by heat, it should be understood that other activating inputs may also be employed. It should be further understood that the particular type of TIM employed in forming the sleeve may vary. Further, while shown and described as providing multiple permanent magnets in each slot, it should be understood that each slot may also be provided with a single permanent magnet. Also, it should be understood that the sleeve may be provided about the permanent magnets and shrunk prior to insertion into the laminations or the sleeve may simply be left loosely about the permanent magnet.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric machine comprising:
    a housing;
    a stator fixedly mounted relative to the housing; and
    a rotor assembly rotatably mounted relative to the stator, the rotor assembly including a plurality of rotor laminations forming a rotor body, one or more permanent magnets provided in the rotor body, and a sleeve formed from a shrinkable tube having a selectively changeable internal dimension extending around the one or more permanent magnets, the sleeve providing a thermal interface between the one or more permanent magnets and the rotor body.

2. The electric machine according to claim 1, wherein the selectively changeable internal dimension is configured and disposed to shrink when exposed to heat.

3. The electric machine according to claim 2, wherein the selectively changeable thickness is configured and disposed to expand when exposed to heat.

4. The electric machine according to claim 1, wherein the shrinkable tube includes an outer surface and an inner surface that define a selectively changeable thickness.

5. The electric machine according to claim 1, wherein the sleeve is formed from a thermal interface material.

6. A rotor assembly comprising:
    a rotor body;
    a plurality of rotor laminations forming a rotor body;
    one or more permanent magnets provided in the rotor body; and
    a sleeve formed from a shrinkable tube having a selectively changeable internal dimension extending around the one or more permanent magnets, the sleeve providing a thermal interface between the one or more permanent magnets and the rotor body.

7. The rotor assembly according to claim 6, wherein the selectively changeable internal dimension is configured and disposed to shrink when exposed to heat.

8. The rotor assembly according to claim 6, wherein the shrinkable tube includes an outer surface and an inner surface that define a selectively changeable thickness.

9. The rotor assembly according to claim 8, wherein the selectively changeable thickness is configured and disposed to expand when exposed to heat.

10. The rotor assembly according to claim 6, wherein the sleeve is formed from one of at least one of a silicone rubber, epoxy, polyolefin, poly tetra fluoro ethylene (PTFE), fluorinated ethylene propylene (FEP), polyvinylidene fluoride (PVDF) polyvinyl chloride (PVC) and a thermal interface material.

11. The rotor assembly according to claim 10, wherein the thermal interface material comprises at least one of an aluminum powder, Alumina ($Al_2O_3$), graphite, boron nitride, and beryllium oxide.

12. A method of forming a rotor assembly, the method comprising:
    stacking a plurality of rotor laminations;
    aligning a plurality of slots formed in each of the plurality of rotor laminations;
    joining the plurality of rotor laminations to form a rotor body;
    inserting a permanent magnet into a sleeve formed from a shrinkable tube having a selectively changeable internal dimension; and
    guiding the permanent magnet into one of the plurality of slots.

13. The method of claim 12, further comprising: shrinking the sleeve about the permanent magnet.

14. The method of claim 13, wherein shrinking the sleeve about the permanent magnet includes exposing the sleeve to a source of heat.

15. The method of claim 14, wherein exposing the sleeve to a source of heat includes operating the electric motor.

16. The method of claim 12, wherein shrinking the sleeve about the permanent magnet includes elastically contracting the sleeve.

17. The method of claim 12, further comprising: expanding a thickness of the sleeve to secure the permanent magnet in the rotor body.

18. The method of claim 12, wherein inserting the permanent magnet into the sleeve includes providing a thermal interface material about the permanent magnet.

\* \* \* \* \*